United States Patent
Carletti et al.

(12) 
(10) Patent No.: US 6,722,812 B1
(45) Date of Patent: Apr. 20, 2004

(54) CONNECTING DEVICE FOR TUBULAR FRAME MEMBERS, PARTICULARLY FOR STRETCHER

(75) Inventors: Enrico Carletti, Pieve di Cento (IT); Alessandro Lapini, San Casciano in Val di Pesa (IT)

(73) Assignee: Ferno Washington Italia S.r.l., Prato (IT)

( * ) Notice: Subject to any disclaimer, the term of this patent is extended or adjusted under 35 U.S.C. 154(b) by 0 days.

(21) Appl. No.: 10/030,640

(22) PCT Filed: Feb. 27, 2000

(86) PCT No.: PCT/IB00/00210

§ 371 (c)(1), (2), (4) Date: Jan. 2, 2002

(87) PCT Pub. No.: WO01/03628

PCT Pub. Date: Jan. 18, 2001

(30) Foreign Application Priority Data

Jul. 7, 1999 (IT) ......................................... BO99A0380

(51) Int. Cl.[7] .................................................. A61G 1/00
(52) U.S. Cl. ......................... 403/385; 5/82; 403/322.5; 403/52
(58) Field of Search ................................ 403/385, 321, 403/322.4, 322.5, 52; 5/82; 1/627

(56) References Cited

U.S. PATENT DOCUMENTS

| | | | |
|---|---|---|---|
| 1,868,508 A | 7/1932 | Stewart | |
| 2,649,177 A | * 8/1953 | Anderson | 193/35 J |
| 2,845,307 A | 7/1958 | Holmes | |
| 3,336,060 A | * 8/1967 | Bradford | 403/108 |
| 3,643,988 A | 2/1972 | Ingvartsen | |
| 3,653,079 A | 4/1972 | Bourgraf et al. | |
| 3,801,208 A | 4/1974 | Bourgraf et al. | |
| 3,921,231 A | 11/1975 | Bourgraf et al. | |
| 4,643,388 A | 2/1987 | Tazawa | |
| 5,217,315 A | 6/1993 | Rosane | |

* cited by examiner

*Primary Examiner*—John R. Cottingham
(74) *Attorney, Agent, or Firm*—Dinsmore & Shohl LLP

(57) ABSTRACT

A connecting device for tubular frame members, first (2a) and second (2b), particularly for stretcher (3) having two half-stretchers (3a, 3b), comprises: connecting means, first (10) and second (20), respectively fixed to the tubular frame members, first (2a) and second (2b), and complementarily connectable in correspondence of a coupling condition (A) of the tubular frame members (2a, 2b); support means, first (30) and second (40), respectively joined with the connecting means, first (10) and second (20); booking means, first (50) and second (60), respectively joined to the connecting means, first (10) and second (20), and fit to engage with the support means, respectively second (40) and first (30), in correspondence of the coupling condition (A) and detachable from the support means (30, 40) in correspondence of an uncoupling condition (D) of the tubular frame members (2a, 2b), in consequence of the disengagement of the hooking means (50, 60) from the support means (30, 40) and of the consequent mutual disconnection of the connecting means (10, 20).

13 Claims, 6 Drawing Sheets

CONNECTING DEVICE FOR TUBULAR FRAME MEMBERS, PARTICULARLY FOR STRETCHER

TECHNICAL FIELD

This invention relates to medical devices to be used in first aid emergency situations for immobilizing and carrying the traumatized injured persons.

Particularly the invention refers to a connecting device for tubular frame members of a scoop stretcher with which is possible to "pick-up" an injured person laying on the ground without any risk to let him suffer more possible trauma.

BACKGROUND OF THE INVENTION

The known scoop stretchers essentially consist of two half-stretchers detachably connected near to the ends by means of articulated hooking devices.

Document U.S. Pat. No. 3,653,079 discloses a pivot lock for splint-stretcher essentially consisting of a female part including a "U" shaped seat transversely crossed, in a substantially central position, by a hooking pivot and of a male part made of a tongue which is complementarily inserted into the "U" shaped seat and its head is provided with a notch fit for partially housing the pivot pin and fit to be closed at eyelet by a latch member co-operating with it in order to "hook" the pivot pin by way of eyelet. This latch member is pivotally connected to the tongue and is kept in the eyelet-closure condition by a contrast spring.

The main drawback of the known connection and coupling devices for stretchers is that they can be accidentally opened, with very serious consequence for the patient carried by the stretcher, especially when the stretcher is handled by the operators particularly in narrow environments (ditch, inside the vehicles, etc.) or in situations hurried up by the emergency and quickness of the intervention.

To prevent the opening and then the accidental disconnection of the device, it was suggested to use a safety hook assembled on the female part whose hooking end engages a recess made in the tongue of the male part in correspondence of the coupling condition.

Such solution, notwithstanding represents an effective remedy against the accidental opening of the device, has however the disadvantage of being not very reliable in case of malfunction or failure of the hooking member.

In fact, the hooking members have load function since the weight of the carried patient acts thereon because the stresses are transferred from the two half-stretcher through the tubular frame members to the hooking and locking members.

Other disadvantage of the known solutions is that the closing or opening of the stretcher by the operator is uncomfortable, because the hook of the device is positioned in the inner side of the stretcher, in other words in correspondence of the area of the head or feet of the transported injured person.

Furthermore, the solution that presents a safety hook, for coupling or uncoupling the half-stretcher, requests to act on the free ends of both hooks, by using both hands. Consequently, such operations are uncomfortable because of the inappropriate positions of the operator hands and because the coupling/uncoupling button of the main locking hook member is placed in the inner edge of the stretcher.

DISCLOSURE OF THE INVENTION

The main object of the present invention is to propose a connecting device for preventing the opening and the accidental disconnection of said device, particularly due to shocks or malfunction of the device.

Other object is to propose a device for allowing a comfortable coupling and uncoupling of the half-stretcher by the operator.

A further object is to propose a device simple and easy to be made and to be maintained.

These and other objects and advantages of the present invention will become apparent from the subsequent detailed description of best mode for carrying out the invention and appended claims taken in conjunction with the accompanying drawings.

BEST MODE FOR CARRYING OUT THE INVENTION

Figure 1:
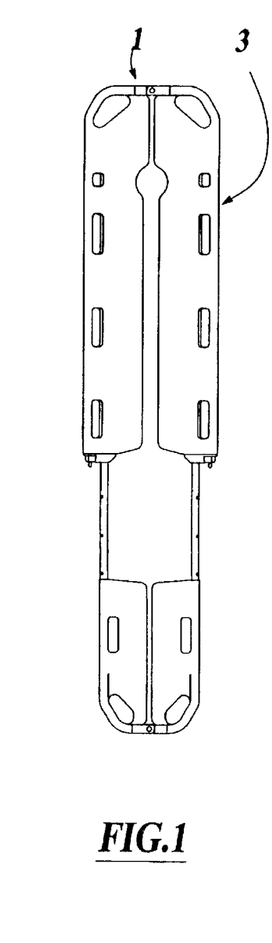
FIG. 1 shows a reduced schematic view, in a coupled condition, of the half-stretchers interconnected by means of the connecting device according to the present invention.
Figure 2A:
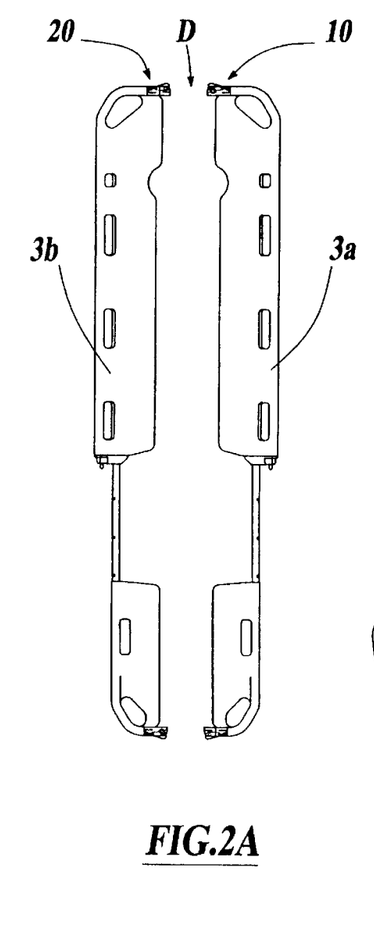
FIGS. 2A and 2B show a schematic view, respectively in a uncoupled and a partially coupled condition, of the half-stretchers in FIG. 1.
Figure 2B:
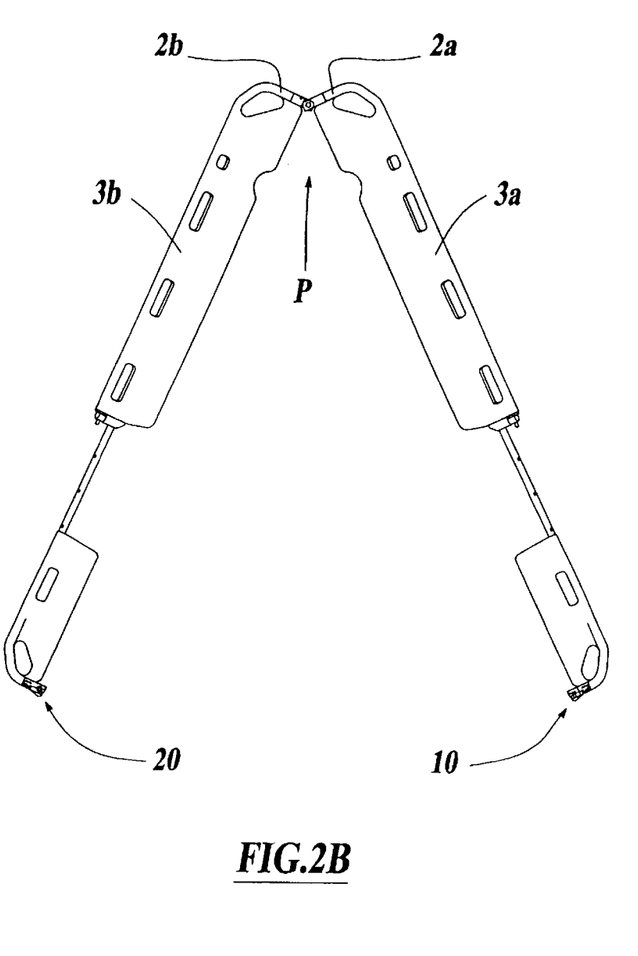
Figure 3:
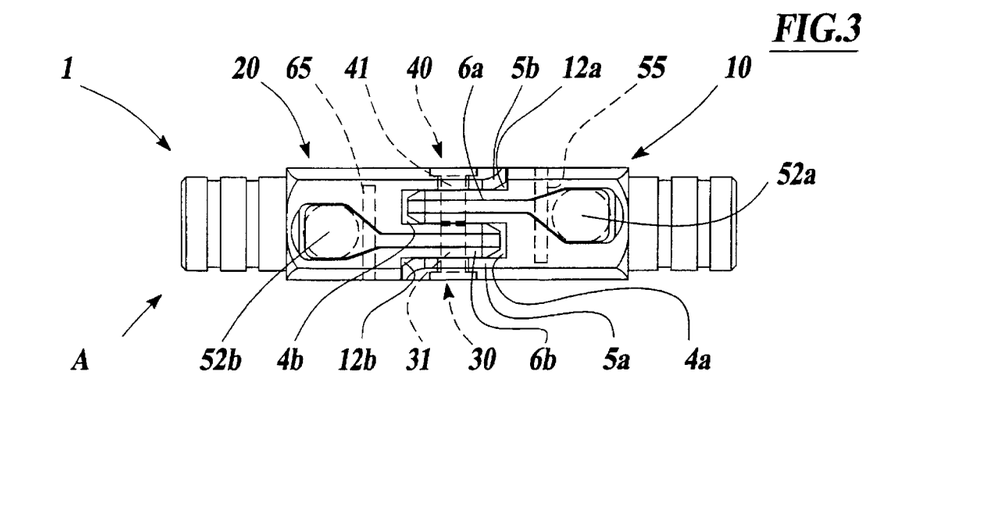
FIG. 3 shows a front view of the device according to the present invention in a coupled condition.
Figure 4:
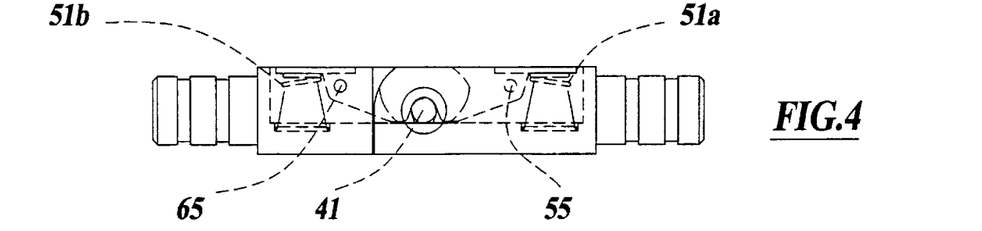
FIG. 4 shows a top view of the device in FIG. 3.
Figure 5:
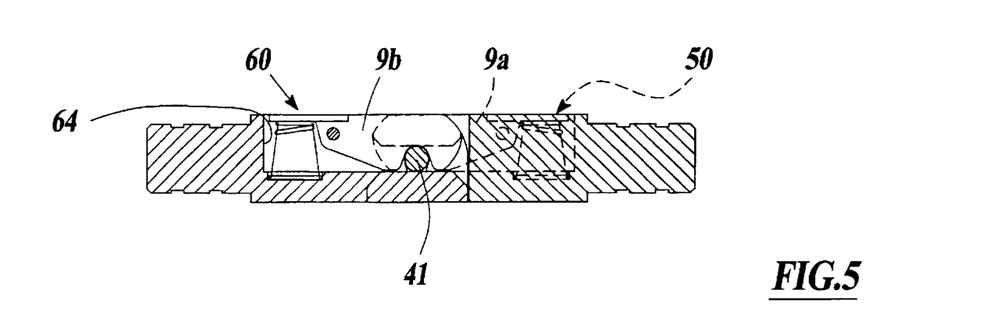
FIG. 5 shows a section view of the device in FIG. 3.

Referring to FIGS. 1, 2A and 2B, numeral 1 indicates a connecting device of a scoop-stretcher 3, composed by two half-stretchers, first 3a and second 3b, whose respective lateral and peripheral supporting tubular frame members, first 2a and second 2b, are detachably connected by means of a device 1.

Referring to FIGS. from 3 to 7, the device 1 comprises a pair of elements of the same embodiment and shape, essentially including connecting means, first 10 and second 20; support means, first 30 and second 40; hooking and locking means, first 50 and second 60.

Each of the connecting means, 10 and 20, is fixed to the respective tubular frame member 2a and 2b and they are complementarily connectable in correspondence of a coupling condition A between the tubular frame members 2a and 2b.

Each of the connecting means, first 10 and second 20, has, on the free end, a seat, respectively first 4a and second 4b, defined by a bracket, respectively first 5a and second 5b, and a tongue, respectively first 6a and second 6b, in such a way that each tongue 6a, 6b, is placed substantially parallel to the relative bracket 5a, 5b.

In this way the two connecting means 10e 20, are complementarily connectable in such a way that the second tongue 6b is detachably insertable into the first seat 4a, and the second bracket 5b overhang the first tongue 6a, while the first tongue 6a is detachably insertable into the second seat 4b, and the first bracket 5a overhangs the second tongue 6b.

The support means, first 30 and second 40, essentially comprise respectively a first pivot pin 31 and a second pivot pin 41, fixed perpendicularly, respectively to the inside wall of first bracket 5a and second bracket 5b.

Each tongue, first 6a and second 6b, has a recess, respectively first 8a and second 8b fit for housing the corresponding second pivot pin 41 and first pivot pin 31.

The hooking and locking means, first 50 and second 60, are respectively pivoted by means of related pins, first 55 and second 65, to the connecting means, first 10 and second 20, and are fit to hook the respective pivot pins, second 41 and first 31, in correspondence of the coupling condition A.

Each of the hooking means, first 50 and second 60, includes a hook, respectively first 9a and second 9b, whose free end is insertable in the corresponding tongue, respectively first 6a and second 6b, in such a way to hook the corresponding pivots, second 41 and first 31, in correspondence of the coupling condition A.

The hooking means, first 50 and second 60, are inside a correspondent housing, first 54 and second 64, of the connecting means, 10 and 20, in such a way that the operating free ends, first 52a and second 52b, of the hooking means, first 50 and second 60 are placed on the plane defined by the side surfaces of the connecting means, 10 and 20. In this way such operating free ends or buttons are faced outwardly with respect to the stretcher 3 so as to be faced to the operator carrying it.

Furthermore, the hooking means, 50 and 60, are permanently kept in the coupling condition A by means of the elastic reaction of the respective elastic means, first 51a and second 51b, for example springs, interposed respectively between the lower walls of the operating buttons, 52a and 52b, and the bottom of the related housing, first 54 and second 64, of the connecting means, 10 and 20.

Figure 9:
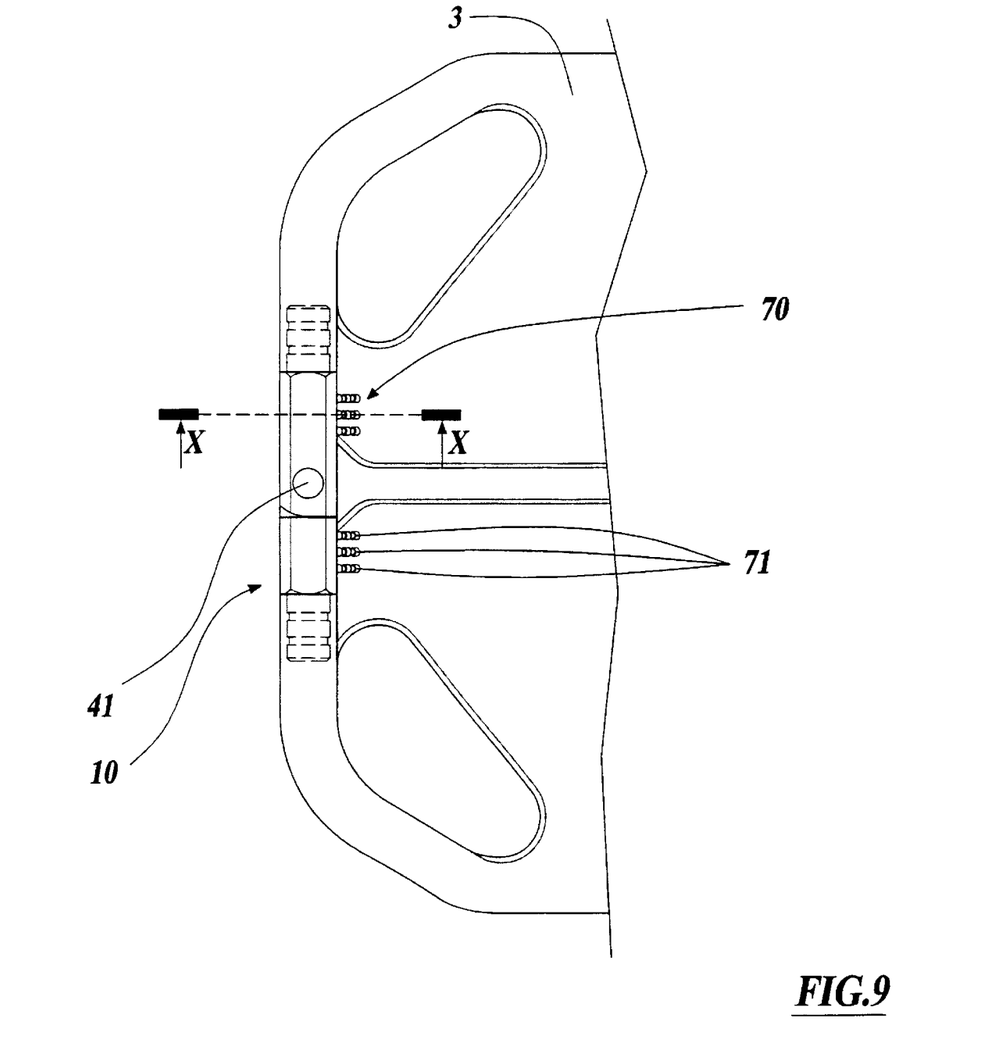
FIG. 9 shows a top view of a stretcher portion in a coupled condition in which some parts have been removed for better viewing other parts.
Figure 10:
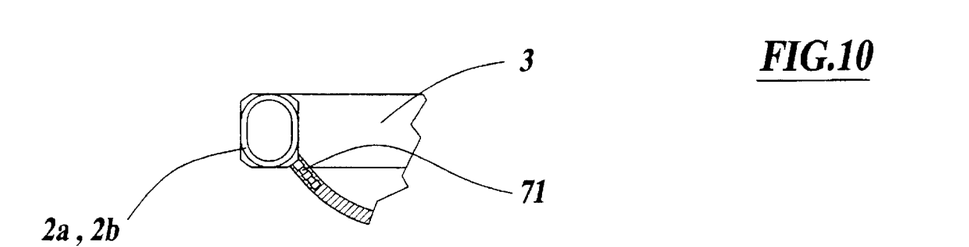
FIG. 10 shows a partial section view of the device taken along the line X—X in FIG. 9.

In FIGS. 9 and 10 is shown a variant of the device 1 which has anchorage means 70, essentially composed by inserts 71, fixed to the connecting means, first 10 and second 20, fit to lock these latter to the frame of the stretcher 3. In particular each anchorage means 70 is provided with three inserts 71 inserted in the plastic material during the forming of each half-stretcher frame.

The utilization of the device 1 is extremely simple and reliable, because the operator, after approaching the two tubular frame members, 2a and 2b, in order to join them through the device 1, has to press onto the operating buttons 52a and 52b or to approach forcedly the two tubular frame members 2a and 2b, in order to overcome the strength exerted by the elastic reaction of the springs 51a and 51b and thus to push away the hooks 9a and 9b from the pivot 31 and 41. At this point the operator approaches furthermore the two tubular frame members and hence the connecting means, 10 and 20, until the first bracket 5a and first tongue 6a insert in the respective housing made in the second connecting means 20, namely in second seat 4b and in a second notch 12b. Similarly, the second bracket 5b is inserted in a first notch 12a and the second tongue 6b is inserted into the first seat 4a.

These connections take place until the pivots, first 31 and second 41, engages the bottom of the correspondent recesses, second 8b and first 8a, and therefore the safe and stabile hooking of the pivots, first 31 and second 41, is firmly and safely obtained by means of the hooks, respectively first 9a and second 9b.

It is advantageous to notice that the above mentioned hooking, that is achieved also if the operating buttons 52a and 52b are not operated, is allowed by virtue of inclined leading edges, first 19a and second 19b, made on the head of the related hooks 9a and 9b.

Figure 6:
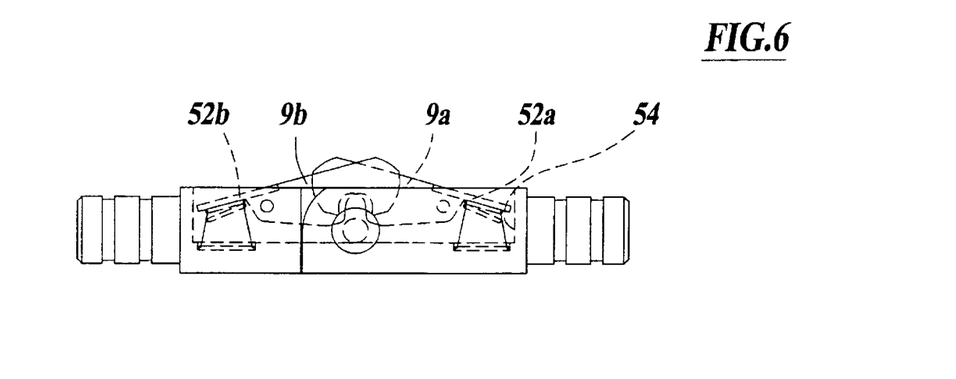
FIG. 6 shows a top view of the device in FIG. 3 in a partial coupled condition.

In such a way the coupling condition A is operated, while the reversed operations lead to the uncoupling condition D, shown in details in FIG. 6, provided that the operator, using normally both the hands, press on the operating buttons, 52a and 52b, in order to release the hooks 9a and 9b from the support means 30, 40 in correspondence of the uncoupling condition D of the tubular frame members 2a and 2b.

Therefore it is necessary to release both the hook means 50, 60 from the support means 30, 40 in order to separate the connecting means first 10 and second 20, one from the another.

In a variant of the invention, the connecting means, first 10 and second 20, are pivotally constrained to the tubular frame members, respectively first 2a and second 2b.

Figure 8:
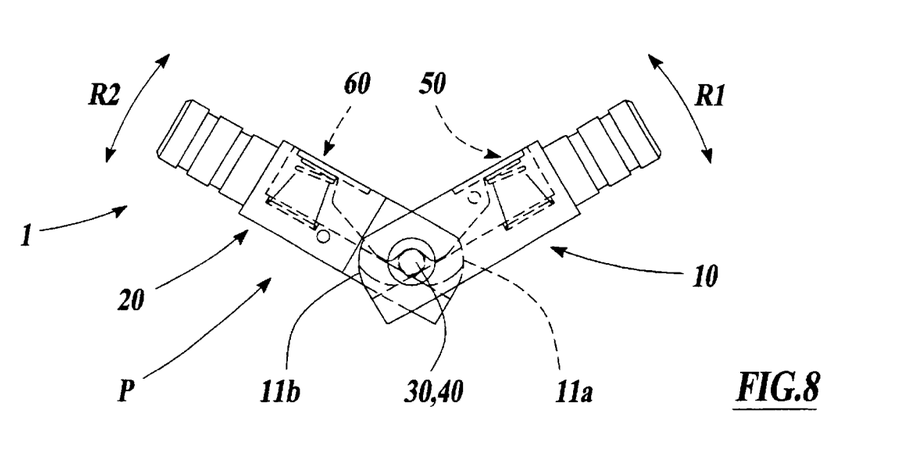
FIG. 8 shows a top view of the device in FIG. 3 in a coupled and folded up condition.

It is convenient to specify that the connecting means, first 10 and second 20, have a chamfer edge, respectively first 11a and second 11b, in correspondence of a free end of the connecting means 10, 20 to allow the mutual rotation around the support means 30, 40 in the approach direction, shown by the arrows R1 and R2 of FIG. 8, of the free ends of the hooking means, first 50 and second 60, in correspondence of a mutual folding condition P of the two half-stretcher 3a, 3b.

Figure 7:
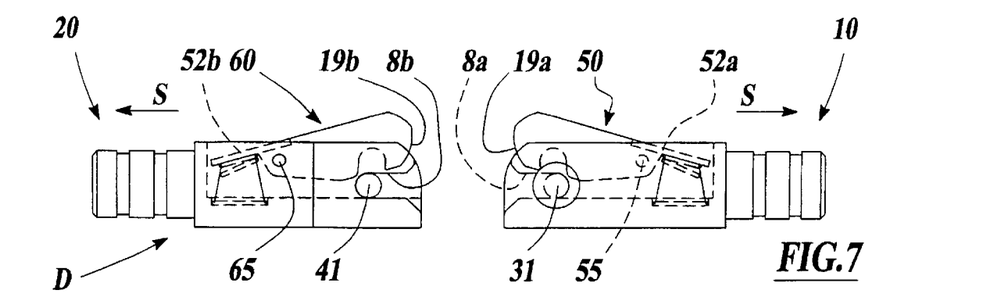
FIG. 7 shows a top view of the device in FIG. 3 in a uncoupled condition.

The tubular frame members, first 2a and second 2b, are therefore detachable by moving them according to the arrows S of FIG. 7 because none of the two hooks 9a and 9b is hooked to the complementary pivot pin 31, 41.

The two tubular frame members 2a and 2b cannot be released whether only the first hook 9a is disconnected from the second pivot 41, and similarly whether only the second hook 9b is disconnected from the first pivot 31.

The release of the two tubular frame members 2a and 2b happens only if both the hooks 9a and 9b are disconnected from the complementary pivots 41 and 31.

This solution is therefore fit for preventing accidental opening of the stretcher particularly due to malfunction of the device, for example an unexpected failure of the contrast spring of anyone of the hooks, because the two tubular frame members are still connected steadily by means of the remaining hook.

In the variant shown in FIGS. from 11 to 16 the seats, first 4a and second 4b, are longitudinally extended by means of shaped recesses, respectively first 4c and second 4d, fit to allow the free rotation respectively of the hooks 9b and 9a in correspondence of the folded condition P of said two half-stretcher 3a, 3b.

The heads of said hooks, first 9a and second 9b, have inclined leading edges, respectively first 19a and second 19b, approximately shaped as a circumference arch, and the correspondent tongues, respectively first 6a and second 6b, have recesses, respectively first 8a and second 8b, "V" shaped in such a way to allow the coupling or the uncoupling of said connecting means, first 10 and second 20, also in correspondence of the mutual folded condition P.

It is important to notice that by virtue of these variant, said connecting means, first 10 and second 20, can be rotated from the respective straight coupled condition A of 180° till the folded condition P up to less than 90°.

Besides, this variant allows also the coupling and uncoupling operations in correspondence of angles between the longitudinal axis of the connecting means, first 10 and second 20, varying from 180° up to less than 110° in order to easily assemble and disassemble the two half shelves of the stretcher 3.

Figure 11:
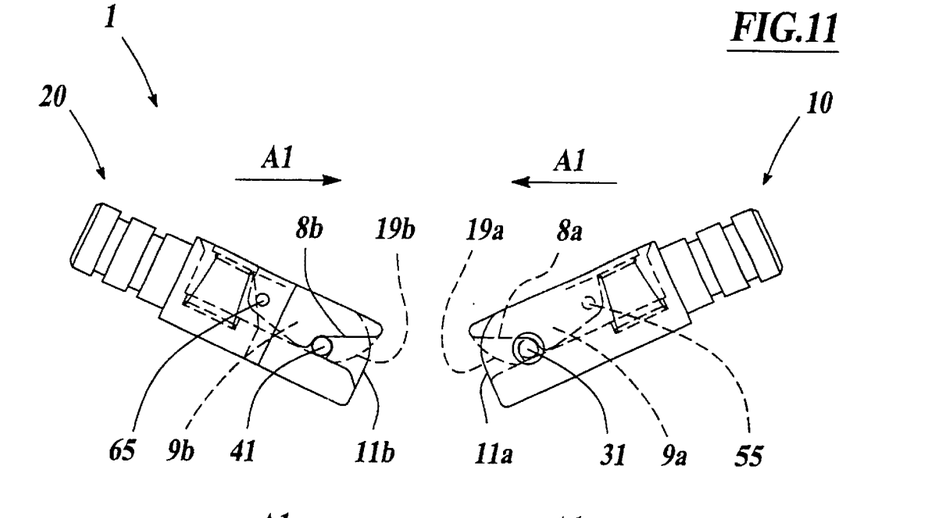
FIG. 11 shows a top view of a variant of the device according to FIG. 3, in an uncoupled condition.
Figure 12:
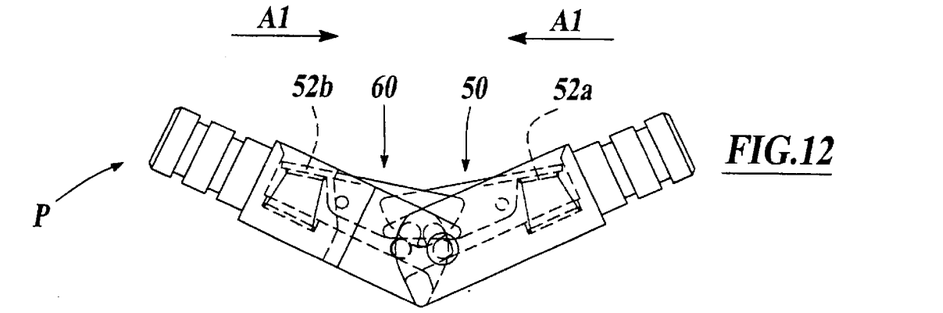
FIG. 12 shows a top view of the device in FIG. 11 in a partial coupled condition.
Figure 13:
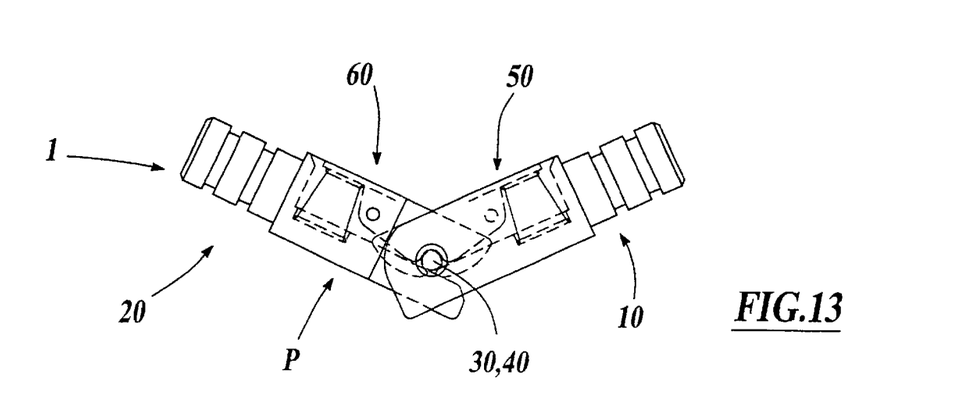
FIG. 13 shows a top view of the device in FIG. 11 in a coupled and folded up condition.
Figure 14:
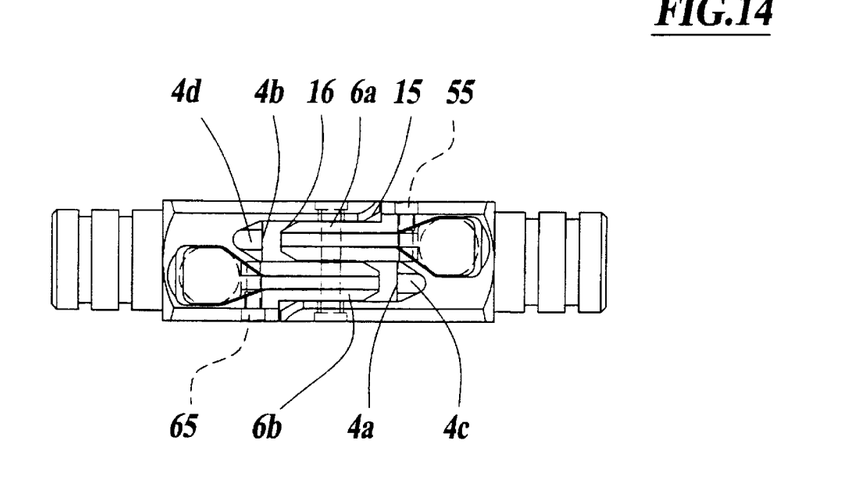
FIG. 14 shows a front view of the device in FIG. 11 in a coupled condition.
Figure 15:
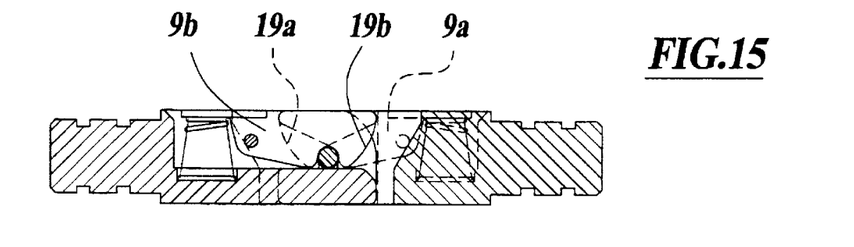
FIG. 15 shows a top section view of the device in FIG. 11 in a coupled condition.
Figure 16:
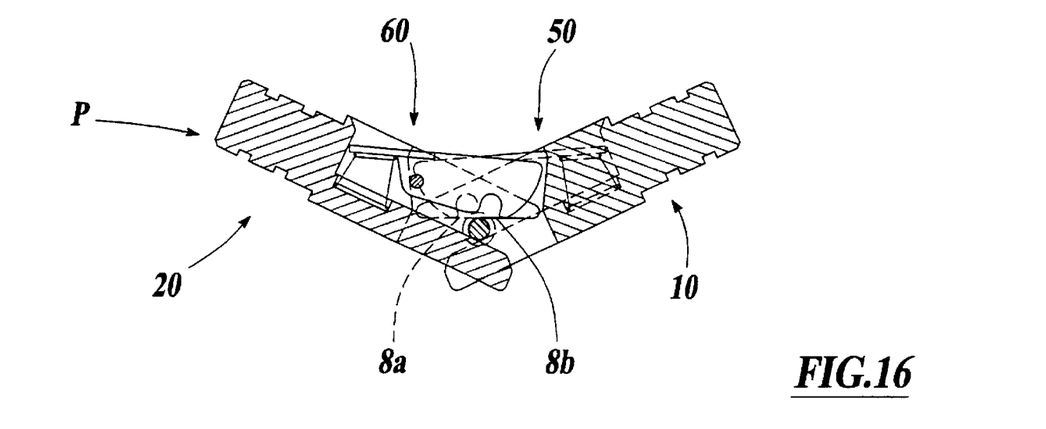
FIG. 16 shows a front section view of the device in FIG. 11 in a folded and partially coupled condition.

More precisely, the connecting means, first 10 and second 20, also if in the folded condition P, can be hooked moving them in the direction of the arrows A1 of FIGS. 11 and 12, until the pivots, first 31 and second 41, engage the bottom of the correspondent recesses, second 8b and first 8a, and so obtaining the safe and stabile hooking and locking of the pivots, first 31 and second 41, by means of the hooks, respectively first 9a and second 9b (see FIG. 11).

The connecting means, first 10 and second 20, can mutually rotate in the approaching direction so reaching an extreme folded condition. The connecting means, first 10 and second 20, can be detached in the folded condition P by pressing on the operating buttons, 52a and 52b, in order to disengage the hooks 9a and 9b from the support means 30, 40 and moving them in opposite directions.

According to the preferred embodiment an the variants of the device 1, it is important to notice that the two hook 9a and 9b avoid the accidental opening of the device 1 in case of knock of anyone of the two operating buttons 52a and 52b during the carriage of the stretcher 3, for instance in difficult situation, because the possible disconnection of an hook do not cause the opening of the stretcher since the other hook is always engaged with the correspondent pivot: thus this device has double linking, supporting and locking hook members which could be considered a "redundant system" but it is extremely efficient and safe in order to avoid accidental and inopportune opening of the stretchers.

Advantageously the two hook 9a and 9b are placed in correspondence of the external lateral walls of the connecting means, first 10 and second 20, so that their operative free ends, first 52a and second 52b, face the operator.

Furthermore, the brackets, first 5a and second 5b, have related beveled edges 15 and the tongue, first 6a and second 6b, have correspondent beveled edges 16 in such a way to easy the coupling/uncoupling thereof, that is of the connecting means, first 10 and second 20.

In this way the coupling and uncoupling operation of the half-stretchers 3a and 3b becomes very simple because the operator puts the hands in a natural position without interfering with the body of the patient carried by the stretcher 3.

It is very important to specify that such connecting device 1 is usable not only for coupling the tubular frame members of the two half-stretchers in a scoop-stretcher 3, but it is also used to connect the heads of two tubular frame members of general use in such a way to allow the uncoupling, even if they are subjected to torsion and/or flexion, and anyhow such device is able to prevent the accidental disconnection.

The main advantage of the present invention is to provide a connecting device for a stretcher fit to allow the coupling/uncoupling of two tubular frame members of the scoop-stretcher, also in correspondence of flexion and/or torsion condition of the stretcher portions disclosed by the present invention, and to avoid the accidental opening of the same device and therefore the accidental uncoupling of the two tubular frame members of the stretcher, particularly in consequence of malfunctions or failures of some coupling device element or accidental knocks.

Other advantage of this invention is to provide a handy device, fit to allow both an easy operation of the coupling device and the coupling and the uncoupling of the connecting means also in correspondence of the mutual folded condition.

Further advantage is to provide a connecting device of simple production, at low cost and with high level of reliability.

What is claimed is:

1. A connecting device for first and second tubular frame members of a scoop stretcher, comprising:

first and second connectors mountable to said first and second tubular frame members, respectively, said first and second connectors having first and second supports, respectively, and first and second locks adapted to engage said second and first supports, respectively, in correspondence to a coupling condition and adapted to detach from said supports in correspondence to an uncoupling condition, wherein said connectors are configured to pivotably engage each other in said coupling condition.

2. The connecting device according to claim 1 wherein said locks are adapted to be elastically held in said coupling condition.

3. The connecting device according to claim 1 wherein said connectors further include a plurality of anchoring inserts.

4. The connecting device according to claim 1 wherein said connectors have chamfered edges adapted to allow rotation of said locks about said supports.

5. The connecting device according to claim 4 wherein said connectors are adapted to couple or uncouple from a straight coupled condition of 180° till a folded condition up to 110°, and vice-versa.

6. The connecting device according to claim 1, wherein said first and second connectors are complementary and have respective first ends mountable to said tubular frame members, and free ends having respective first and second brackets defining first and second seats, respectively, wherein said first and second supports are first and second pivot pins which span said first and second seats, respectively.

7. The connecting device according to claim 6 wherein said locks comprises first and second hooks pivotably connected to said first and second connectors, respectively, and adapted to releasably engage said pivot pins in correspondence to said coupling condition.

8. The connecting device according to claim 6 wherein said first and second bracket further include first and second tongues detachably insertable into said second and first seats, respectively.

9. The connecting device according to claim 8 wherein said tongues defining first and second recesses, respectively, and wherein said recesses are adapted to accommodate said pins and said brackets are adapted to overhang said tongues in correspondence to said coupling condition.

10. The connecting device according to claim 8 wherein said locks comprises first and second hooks pivotably connected to said first and second connectors, respectively, and adapted to releasably engage said pivot pins in correspondence to said coupling condition.

11. The connecting device according to claim 8 wherein said brackets have beveled edges and said tongues have correspondent beveled edges.

12. The connecting device according to claim 9 wherein said locks comprises first and second hooks pivotably connected to said first and second connectors, respectively, and adapted to releasably engage said pivot pins when accommodated in said recesses in correspondence to said coupling condition.

13. The connecting device according to claim 12 wherein said seats are longitudinally extended by shaped recesses, heads of said hooks having inclined leading edges each having an approximate arch shape, and said tongues having V-shaped recess.

* * * * *